(12) United States Patent
Wei et al.

(10) Patent No.: US 7,391,824 B2
(45) Date of Patent: Jun. 24, 2008

(54) HIGH-SPEED SERIAL LINK RECEIVER WITH CENTRALLY CONTROLLED OFFSET CANCELLATION AND METHOD

(75) Inventors: Fangxing Wei, Gilbert, AZ (US); Arif Mahmud, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 10/444,310

(22) Filed: May 22, 2003

(65) Prior Publication Data

US 2004/0234010 A1    Nov. 25, 2004

(51) Int. Cl.
*H03K 9/00* (2006.01)
(52) U.S. Cl. ....................................... 375/316
(58) Field of Classification Search ................. 375/316, 375/346, 348, 224–228; 330/261, 258, 351
See application file for complete search history.

(56) References Cited

U.S. PATENT DOCUMENTS

| | | | | |
|---|---|---|---|---|
| 6,420,932 B1* | 7/2002 | Casper | ....................... | 330/258 |
| 6,438,178 B1 | 8/2002 | Lysdal et al. | | |
| 6,496,061 B1* | 12/2002 | Bloom et al. | ................. | 330/51 |
| 6,624,688 B2* | 9/2003 | Jaussi et al. | ................... | 327/552 |
| 2003/0001667 A1* | 1/2003 | Casper et al. | .................. | 330/9 |
| 2003/0016091 A1* | 1/2003 | Casper | ........................ | 333/18 |
| 2003/0025559 A1* | 2/2003 | Goldenberg | ................. | 330/258 |
| 2003/0048136 A1* | 3/2003 | Palaskas et al. | ............. | 330/258 |
| 2004/0035909 A1* | 2/2004 | Yeh et al. | .................... | 228/56.3 |

FOREIGN PATENT DOCUMENTS

WO    WO-2004/107692 A1    12/2004

OTHER PUBLICATIONS

"International Search Report for corresponding PCT Application No. PCT/US2004/012017", (Oct. 10, 2004), 3 pgs.

* cited by examiner

*Primary Examiner*—Chieh M. Fan
*Assistant Examiner*—Jason M. Perilla
(74) *Attorney, Agent, or Firm*—Schwegman, Lundberg & Woessner, P.A.; Gregory J. Gorrie (57) ABSTRACT

A high-speed serial link receiver includes variable offset comparators with centrally controlled offset cancellation. The receiver includes a comparator stage to receive a high-speed differential input signal. Comparator elements of the comparator stage have first and second current sources to provide current to corresponding differential amplifier half-circuits. An offset cancellation controller provides an offset cancellation signal for setting current provided by one of the current sources to at least partially offset an output offset between the differential amplifier half-circuits. A receiver system may be comprised of a plurality of receiver units for receiving a corresponding plurality of channels over high-speed serial links. A state machine may sequentially determine an offset cancellation code for the comparator elements of the receiver units.

3 Claims, 6 Drawing Sheets

HIGH-SPEED SERIAL LINK RECEIVER WITH CENTRALLY CONTROLLED OFFSET CANCELLATION AND METHOD

TECHNICAL FIELD

The present invention pertains to on-chip receivers and receiver systems and, in particular, offset cancellation in receivers for receiving high-speed differential signals.

BACKGROUND

Differential signals are often used for communications between chips and other semiconductor devices on a circuit board because of their reduced susceptibility to noise as well as other factors. As semiconductor devices become more powerful, communications between such devices demand higher data rates. Furthermore, in efforts to reduce power consumption of these ever increasingly powerful devices, it may be desirable to use differential signals with lower peak-to-peak differences (e.g., smaller differential signals). One problem with receiving higher data rate, smaller differential signals is that even slight voltage offsets within comparators become more significant, thus adversely affecting a receiver's ability to accurately receive such signals.

Thus there is a general need for an improved receiver and method of communicating differential signals. There is also a need for a receiver and method for receiving high-speed, low-voltage differential signals over high-speed serial communication links between semiconductor devices. There is also a need for an improved receiver and method for offset cancellation allowing for receipt of smaller differential signals.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Embodiments of the present invention provide an improved receiver and method of communication over high-speed communication links, although the scope of the invention is not limited in this respect. An exemplary receiver may be a high-speed serial link receiver that includes variable offset comparators with centrally controlled offset cancellation, although the scope of the invention is not limited in this respect.

Figure 1:
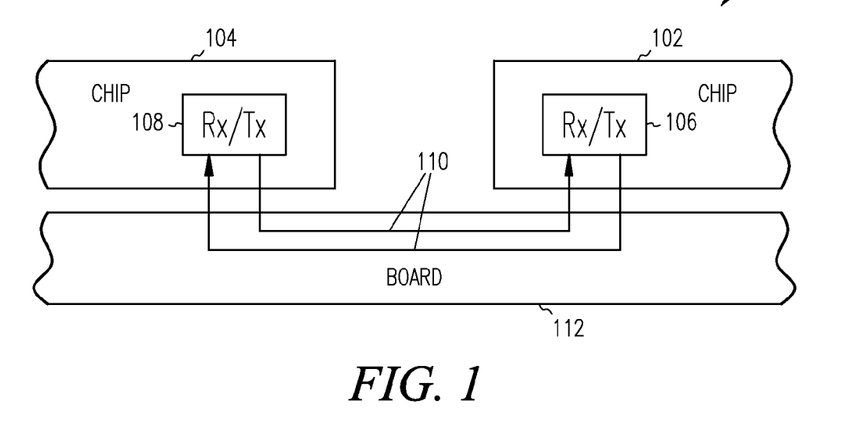
FIG. 1 illustrates a chip-to-chip communication system in accordance with embodiments of the present invention.

FIG. 1 illustrates a chip-to-chip communication system in accordance with embodiments of the present invention. Chip-to-chip communication system 100 is comprised of circuit board 112 having one or more chips 102 and 104 mounted thereon. Communication paths 110 allow for chips 102 and 104 to communicate therebetween. Chips 102 and 104 may include one or more receiver/transmitter systems (Rx/Tx) 106 and 108 to facilitate communication of differential signals over communication paths 110. System 100 may be part of almost any multi-chip system including a personal computer, server system or other type of processing system.

In embodiments, a transmitter on one chip may generate a differential signal and may transmit the differential signal over a communication path to a receiver of another chip, although the scope of the invention is not limited in this respect. In embodiments, many channels of data may be communicated between receivers and transmitters of the chips, although the scope of the invention is not limited in this respect.

In embodiments, at least some of the receivers of Rx/Tx 106 may be high-speed serial link receivers and may include an offset cancellation and control element that may reduce the effects of comparator offset. Comparator offset may be a result of the manufacturing processes. In embodiments, voltage offsets between differential pairs of a comparator element may be on the order of 30 mV, and the differential signals may be separated by less than 87.5 mV, for example. The use of offset cancellation may help allow a receiver to more accurately receive higher frequency and/or data-rate communications over communication paths 110 using lower voltage level differential signals (e.g., 90 mV or less). The offset cancellation signal may help increase the sensitivity of a differential receiver and may make the differential receiver more suitable for high data-rate low-differential swing operation.

In embodiments, a receiver may be a high-speed serial link receiver that includes variable offset comparators with centrally controlled offset cancellation. The receiver may include a comparator stage to receive a high-speed differential input signal. Comparator elements of the comparator stage may have first and second current sources to provide current to corresponding differential amplifier half-circuits. An offset cancellation controller may provide an offset cancellation signal for setting the current provided by one of the current sources to at least partially offset an output offset between the differential amplifier half-circuits.

In other embodiments, the receiver portion of Rx/Tx 106 may include a receiver system. The receiver system may be comprised of a plurality of receiver units for receiving a corresponding plurality of channels over high-speed serial links. A state machine may sequentially determine an offset cancellation code for the comparator elements of the receiver units. The state machine may short the inputs of the receiver units, sequentially select each comparator element, vary the current generated by one of the current sources of the selected comparator element, and latch a multi-bit code to set the current of the varied current source when an output of the selected comparator element toggles.

Chips 102 and 104 may be almost any semiconductor chip including microprocessors, memory devices, graphic devices, personal digital assistant (PDA) devices, and other integrated circuit devices that may exchange data with other devices. In one embodiment, chips 102 and 104 may be part of a server chip set and may communicate server data therebetween over high-speed serial links.

Communication paths 110 may be serial communication links suitable to carry differential signals and be comprised of pairs of conductors. In some embodiments, communication paths 110 may comprise high-speed serial communication links suitable for the communication of differential signals of up to 2.67 Gbps and greater. In some embodiments, communication paths 110 may comprise PCI Express (3GIO) links, USB 2.0 links, or Serial ATA links.

Circuit board 112 may be almost any type of circuit board, such as a mother or daughter board, for a processing system or communication device, and may be comprised of either an organic or inorganic material. Organic substrates may be laminates and may comprise, for example, BT, FR4 or FR5 core material. Inorganic substrates may be a ceramic.

Figure 2:
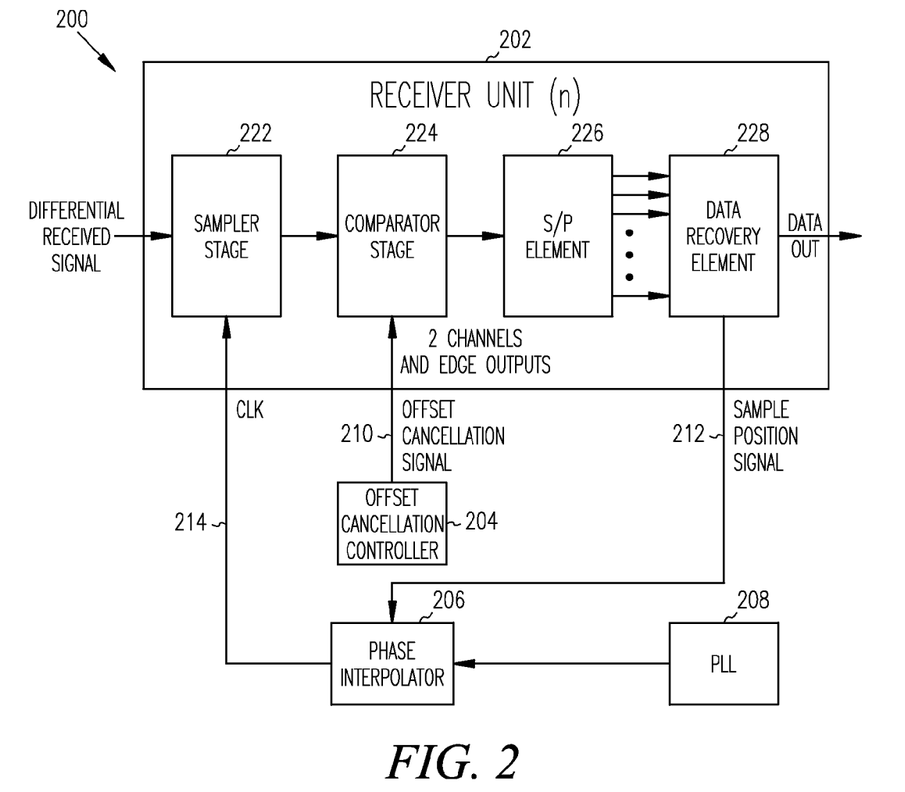
FIG. 2 is a block diagram of a receiver system in accordance with embodiments of the present invention.

FIG. 2 is a block diagram of a receiver system in accordance with embodiments of the present invention. Receiver system 200 may be a high-speed serial link receiver and is an example of a receiver suitable for receipt of differential signals. Receiver system 200 may be suitable for use as the receiver portion of one or more receiver/transmitter systems 106 and 108 (FIG. 1), although other receivers may also be suitable. Receiver system 200 may include one or more receiver units 202. Each receiver unit 202 may receive a differential input signal and generate output data from the differential signal. Receiver system 200 may also include offset cancellation controller 204 to generate one or more offset cancellation signals 210 for the one or more receiver units 202 used for offsetting output differences between differential amplifier half-circuits. Receiver system 200 may also include phase interpolator 206, which may receive sample position indicator signals 212 from receiver units 202 and a frequency signal from phase-locked loop (PLL) 208 to generate clock signals 214 for use by receiver units 202.

Receiver unit 202 may comprise sampler stage 222 to generate a sampled differential signal from the received differential signal. Sampler stage 222 may sample the received differential signal at times in accordance with clock signal 214. Receiver unit 202 may also comprise comparator stage 224, which receives sampled differential input signals from sampler stage 222 and may generate one or more output channels. Receiver unit 202 may also comprise serial-to-parallel (S/P) element 226, which may convert the one or more output channels from comparator stage 224 from a serial form to a parallel form for use by data recovery element 228. Data recovery element 228 may generate output data. Data recovery element 228 may also generate one or more sample position indicator signals 212 for use by phase interpolator 206 in generating clock signal 214.

In one embodiment, comparator stage 224 may include up to four or more comparator elements which may generate a corresponding up to a four or more channel parallel output. In the case of four comparator elements, a four-channel parallel output comprised of two-bit data and two-bit edge signals may be generated. The edge outputs may be used by S/P element 226 to identify the time to capture data on the data signals. In an embodiment, the use of two-bit data and two-bit edges in parallel allow each channel to operate at the frequency of half of the full data rate. In embodiments, the data rate may be up to 2.67 Gbps and even greater.

In embodiments, offset cancellation signal 210 may comprise multi-bit (e.g., a seven-bit) code provided for each comparator element of comparator stage 224. The offset cancellation signal for each comparator element may be determined and set as part of an offset cancellation procedure described below. The offset cancellation signal may reduce or even eliminate a voltage offset between differential amplifier half-circuits of a comparator element. In embodiments, offset cancellation controller 204 may be part of a state machine that may be used to perform an offset cancellation procedure. In one embodiment, offset cancellation controller 204 may determine offset cancellation signals for up to twenty-two or more receiver units 202. In this embodiment, PLL 208 may provide clock signals for the up to twenty-two or more receiver units 202. Each of the receiver units 202 may generate one or more data channel outputs, allowing high-speed serial communication between chips, such as chips 102 and 104 of system 100 (FIG. 1).

Although receiver system 200 is illustrated as having several separate functional elements, one or more of the functional elements may be combined and may be implemented by combinations of software-configured elements, such as processing elements, including digital signal processors (DSPs), and/or other hardware elements. For example, processing elements may comprise one or more microprocessors, DSPs, application specific integrated circuits (ASICs), and combinations of various hardware and logic circuitry for at least performing the functions described herein.

Figure 3:
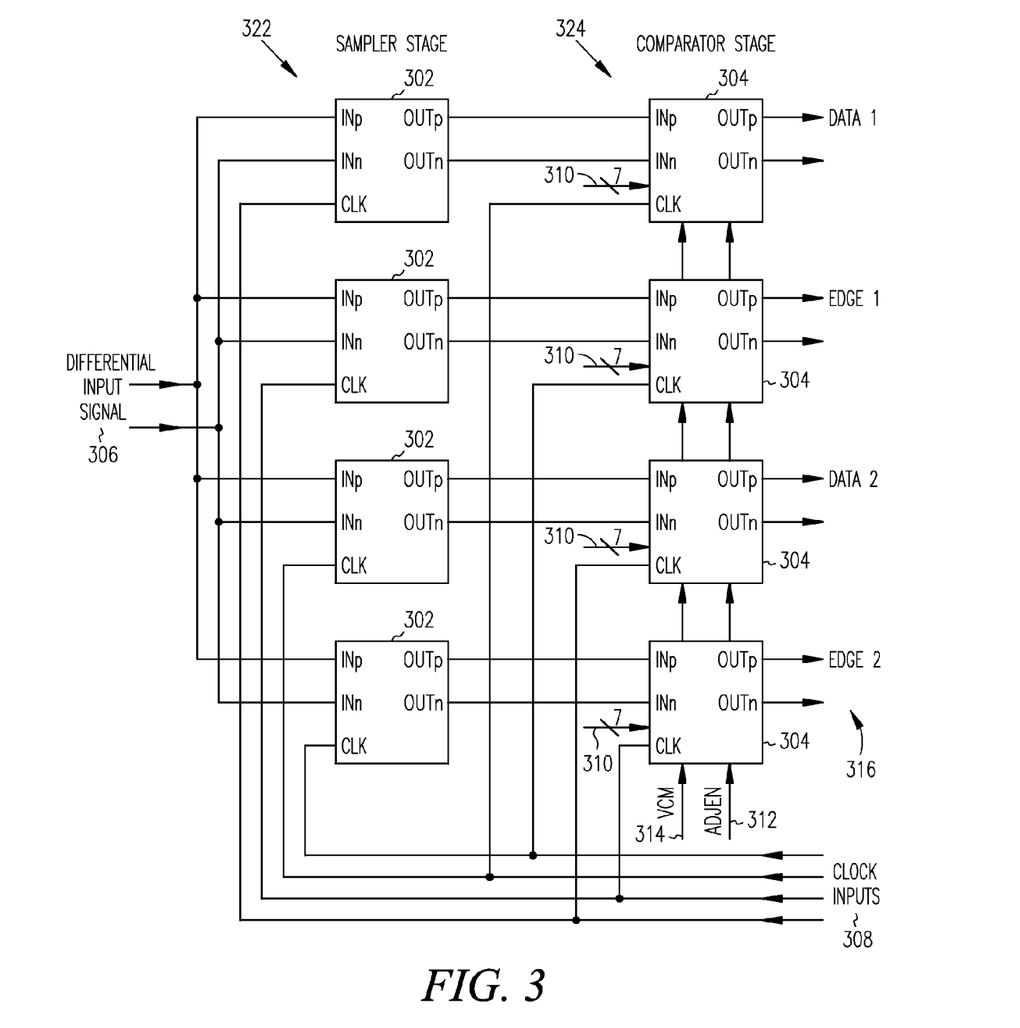
FIG. 3 is a diagram illustrating a sampler stage and a comparator stage of a receiver unit in accordance with embodiments of the present invention.

FIG. 3 is a diagram illustrating a sampler stage and a comparator stage of a receiver unit in accordance with embodiments of the present invention. Sampler stage 322 may be comprised of a plurality of sampler elements 302 to sample differential input signal 306. Comparator stage 324 may be comprised of a plurality of comparator elements 304, which may generate output signals 316 from the sampled differential signals provided by corresponding sampler elements 302. Sampler stage 322 may be suitable for use as sampler stage 222 (FIG. 2), although other sampler stage configurations may also be suitable. Comparator stage 324 may be suitable for use as comparator stage 224 (FIG. 2), although other comparator stage configurations may also be suitable.

The operation of sampler elements 302 and comparator elements 304 may be controlled by clock inputs 308 which may be provided by phase interpolator 206 (FIG. 2). In embodiments, output signals 316 may include one or more data output signals and one or more edge output signals. An edge output signal may indicate transitions between data signals. In these embodiments, each comparator element 304 of comparator stage 324 may provide either an edge output signal or a data output signal.

Comparator elements 304 may also receive offset cancellation signals 310, which may be provided by an offset cancellation controller, such as offset cancellation controller 210 (FIG. 2). In embodiments, an offset cancellation signal may be individually determined for each comparator element 304 as part of an offset cancellation signal procedure. Comparator elements 304 may also each include adjust enable input (ADJEN) 312 and common mode voltage input (VCM) 314 for use in performing the offset cancellation procedure.

Figure 4:
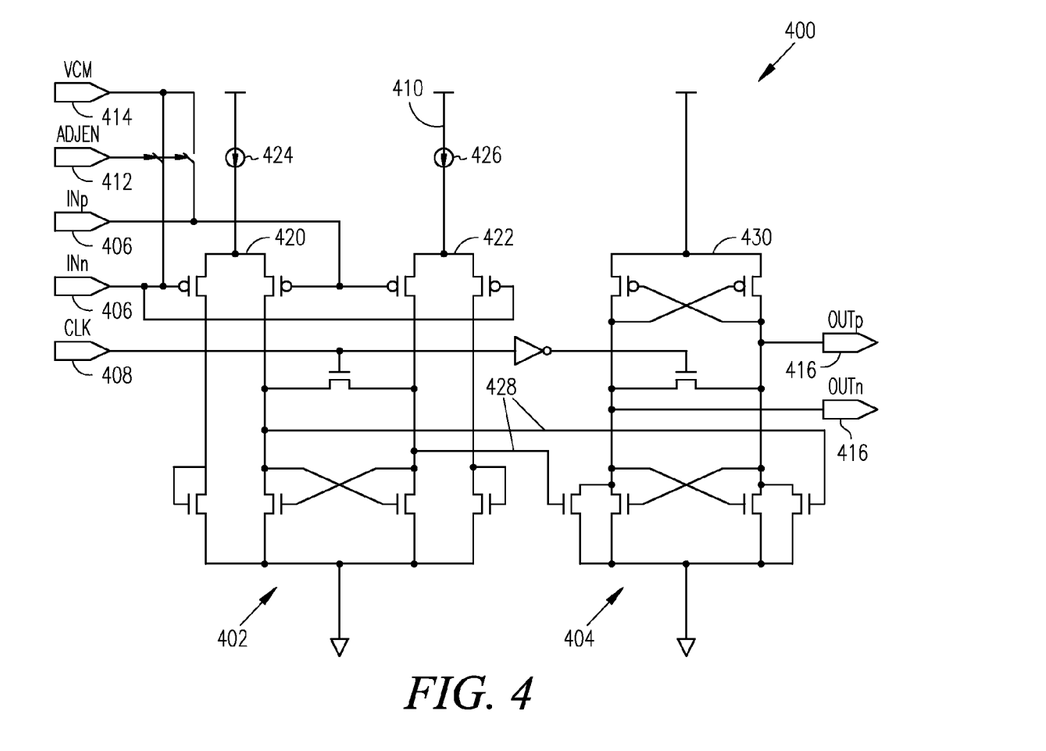
FIG. 4 is a simplified circuit diagram of a comparator element in accordance with embodiments of the present invention.

FIG. 4 is a simplified circuit diagram of a comparator element in accordance with embodiments of the present invention. Comparator element 400, along with some additional logic, may be suitable for use as one of comparator elements 304 (FIG. 3), although other comparator elements may also be suitable. Comparator element 400 may include differential half-circuits 420 and 422 which comprise a differential amplifier to amplify differential input signal 406. Differential input signal 406 may correspond with differential input signal 306 (FIG. 3). Current for differential half-circuit 420 is provided by current source 424 and current for differential half-circuit 422 is provided by current source 426. In accordance with embodiments, current source 424 is a fixed current source, and current source 426 is a variable current source. Current source 426 generates an amount of current for differential half-circuit 422 based on offset cancellation signal 410, which may correspond with one of offset cancellation signals 310 (FIG. 3). In embodiments, signal 410 may be a multi-bit code.

In embodiments, differential half-circuits 420 and 422 may be part of first stage 402 (i.e., a differential amplifier) of comparator element 400, which provides amplified differential signals from outputs 428 to second stage 404 of comparator element 400. In this embodiment, second stage 404 may include cross-coupled inverters 430 acting as a differential latch and/or a second stage amplifier. Second stage 404 may latch the output to the supply voltages (e.g., either Vcc or Vss) based on an inverted version of clock signal 408 to generate a digital differential output signal at outputs 416. Outputs 416 may be followed by some additional logic (e.g., logic gates and a flop) and may generate one of output signals 316 (FIG. 3) which may be provided to a next element in a receiver, such as S/P element 226 (FIG. 2).

Embodiments of the current invention may use two stages of cross-coupled non-linear comparators. For the first stage when clock 408 is high, for example, the first-stage non-linear comparator may be equalized to a maximum amplification region. When clock 408 is low, for example, the first-stage non-linear comparator is fired from the maximum amplification region to achieve maximum sensitivity. For the second stage, when clock 408 is low, for example, the second stage non-linear comparator may be equalized to a maximum amplification region. When clock 408 is high, for example, the second stage non-linear comparator is fired from the maximum amplification region to restore the digital level of the received data.

Current generated by current source 426 may be offset (e.g., set differently) from current generated by current source 424 to compensate for a voltage offset or difference that may exist between differential half-circuits 420 and 422. In general, when there is zero difference in voltage between differential inputs 406, the differential output at differential outputs 428 should also be zero. However, the manufacturing process of the actual devices may result in some common mode voltage difference between the differential half-circuits resulting in a voltage difference between outputs 428 when no differential input is present. Process variations, device size variations, ion implantation, and layout, as well as environmental factors such as time and temperature variations are some examples that may lead to a voltage difference between differential half-circuits 420 and 422 at outputs 428. In embodiments, the voltage difference may be on the order of 30 mV or less, which may be significant when amplifying differential input signals that may be less than 87.5 mV apart, for example. In embodiments, offset cancellation signal 410 may be set to reduce or eliminate the voltage difference at outputs 428.

In accordance with embodiments of the present invention, an offset cancellation procedure may be performed by other system elements, not illustrated in FIG. 4, to determine offset cancellation signal 410 for setting current generated by current source 426. During this procedure, adjust enable input 412 may be set to short inputs 406 together, and a common mode voltage (e.g., about 250 mV) may be provided on input 414, which is coupled to inputs 406 of first stage 402. Current generated by current source 426 may be varied by signal 410 until outputs 416 toggle. The point at which the outputs toggle may be the point at which the voltage offset between the differential amplifiers is cancelled. The current generated by current source 426 may be set accordingly. In one embodiment, the current generated by current source 426 may be varied from about one-half the current generated by current source 424 to about fifty-percent more than the current generated by current source 424. The current may be varied in an approximately linear fashion by signal 410.

Because current source 424 is fixed, less semiconductor area may be required to implement both current sources than if both current sources 424 and 426 were variable. This may reduce the die size as well as reduce power consumption. Furthermore, the number of pins required may also be reduced.

Figure 5:
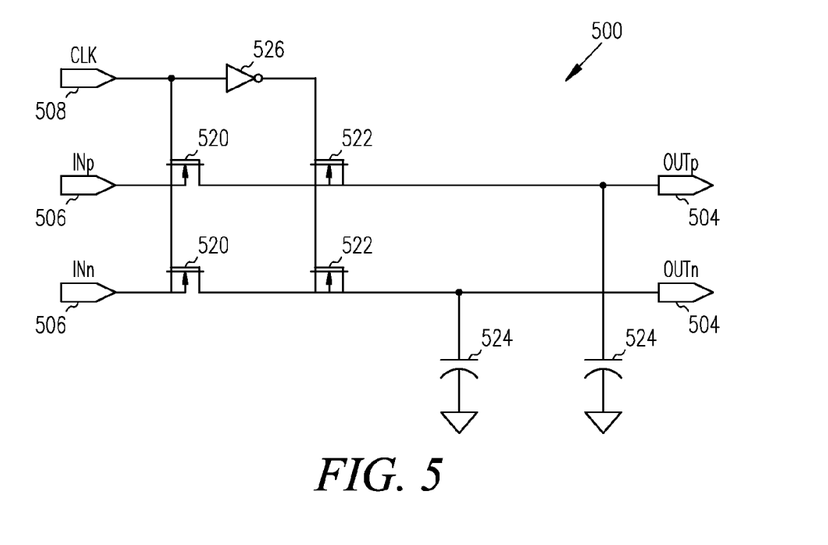
FIG. 5 is a simplified circuit diagram of a sampler element in accordance with embodiments of the present invention.

FIG. 5 is a simplified circuit diagram of a sampler element in accordance with embodiments of the present invention. Sampler element 500 may be suitable for use as one of sampler elements 302 (FIG. 3) although other sampler elements may also be suitable. Sampler element 500 may receive a differential input signal at differential inputs 506 and may provide a sampled differential signal at differential outputs 504. In embodiments, differential outputs 504 may be coupled to differential inputs 406 (FIG. 4) of comparator element 400 (FIG. 4). In embodiments, clock signal 508 may be provided by phase interpolator 206 (FIG. 2). Sampler element 500 may function similar to a sample-and-hold circuit using capacitors 524 to hold the output. Sampler element 500 may also utilize element 522 configured as capacitors as well as inverter 526 to perform switch-noise reduction.

Figure 6:
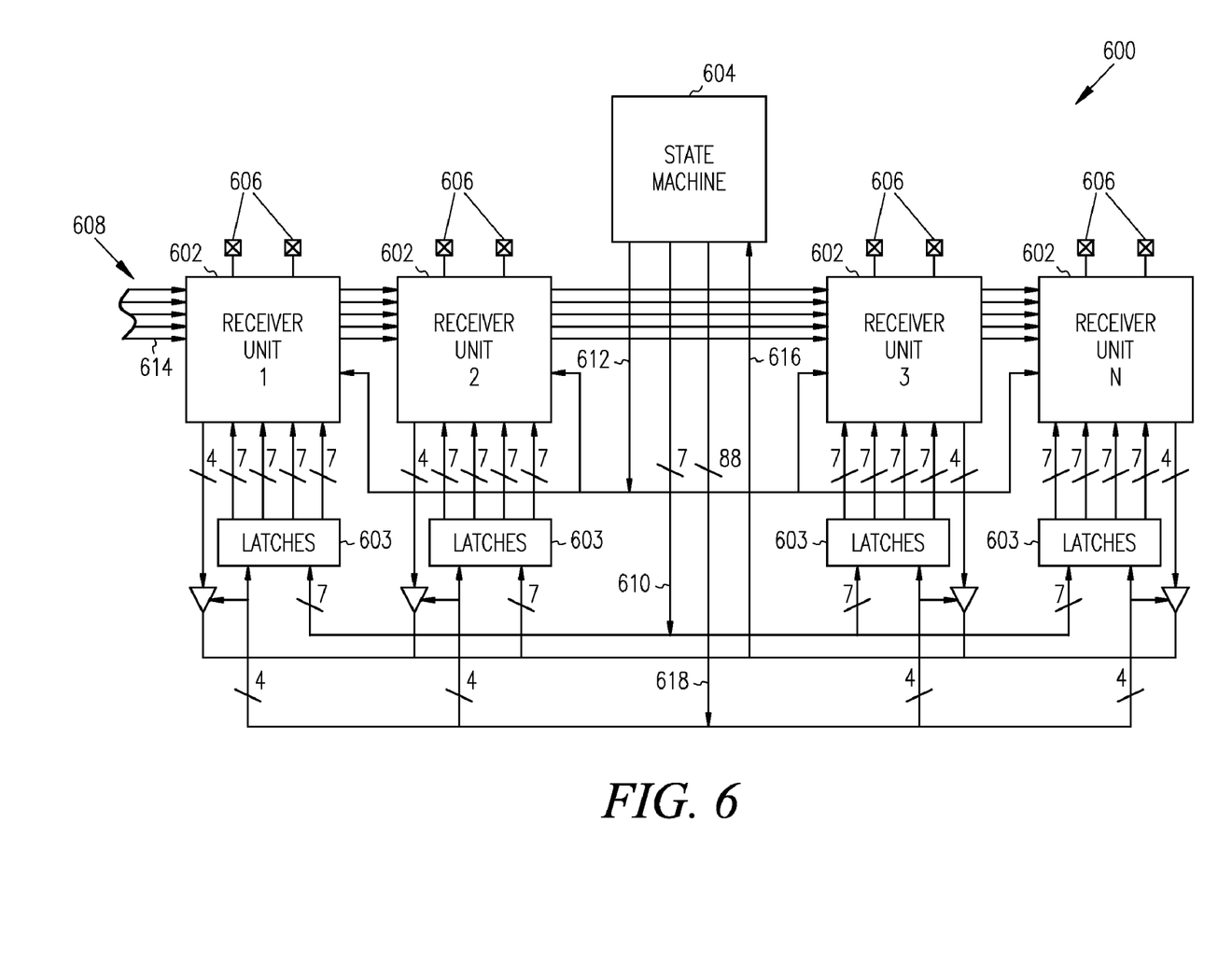
FIG. 6 is a block diagram of a receiver system in accordance with embodiments of the present invention.

FIG. 6 is a block diagram of a receiver system in accordance with embodiments of the present invention. Receiver system 600 is an example implementation of receiver system 200 (FIG. 2) and illustrates a plurality of receiver units 602 (e.g., 1 through N) which may correspond with receiver unit 202 (FIG. 2). In embodiments, state machine 604 along with latches 603, may perform the functions of offset cancellation controller 204 (FIG. 2) and may perform a centrally controlled offset cancellation procedure to determine and set an offset cancellation signal for the comparator elements of receivers 602. Each receiver 602 may receive a differential input signal on differential inputs 606, and may also receive one or more clock signals 608. In embodiments, each receiver 602 may process a different data channel than the other receivers 602 of system 600. Clock signals may be provided by a clock signal source, such as PLL 208 (FIG. 2). In embodiments, state machine 604 may sequentially select each comparator element or each receiver unit and may determine a code that may minimize the comparator element's offset, as previously discussed. The code for the comparators may be stored in one of latches 603 associated with the comparator element. An embodiment of this procedure is described in more detail below.

Figure 7:
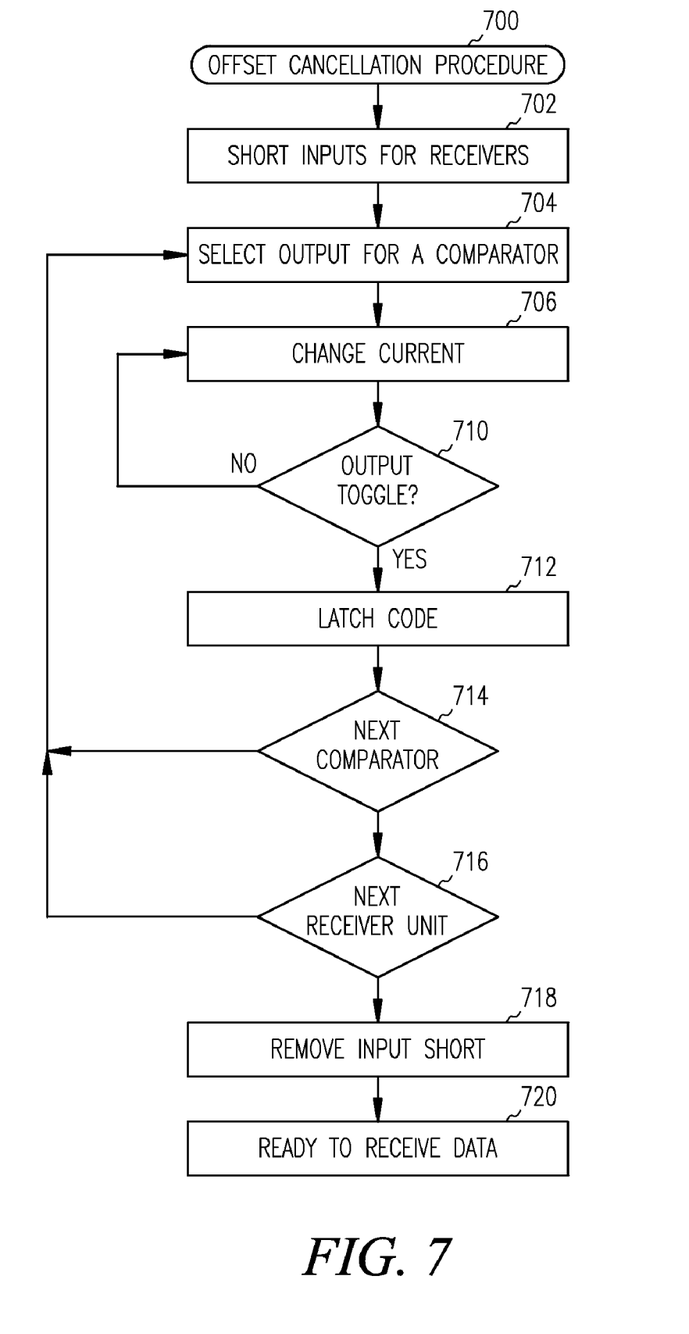
FIG. 7 is a flow chart of an offset cancellation procedure in accordance with embodiments of the present invention.

FIG. 7 is a flow chart of an offset cancellation procedure in accordance with embodiments of the present invention. Procedure 700 may be performed by a state machine, such as state machine 604 (FIG. 6), of a receiver system, such as receiver system 600 (FIG. 6), to determine and set offset cancellation current in comparator elements, such as comparator elements 402 (FIG. 4). In some embodiments, procedure 700 may be performed each time receiver system 600

(FIG. 6) is powered up, while in other embodiments, procedure 700 may be performed when receiver system 600 (FIG. 6) is not receiving. By performing procedure 700, time and temperature variations of the circuitry may be compensated for.

In operation 702, the inputs for the receiver units may be shorted together, and a common mode voltage may be provided to the inputs. In embodiments, state machine 604 (FIG. 6) may cause adjust enable signal 612 (FIG. 6) to go high, shorting inputs 606 (FIG. 6) of each receiver unit together allowing a common mode voltage from input 614 (FIG. 6) to be provided to the differential amplifiers of each receiver unit.

In operation 704, state machine 604 (FIG. 6) may select an output from a comparator element, such as comparator element 400 (FIG. 4) of one of receiver units 602 (FIG. 6) using shared bus 618 (FIG. 6).

In operation 706, the current of a variable current source, such as current source 426 (FIG. 4) is varied. As part of operation 706, state machine 604 (FIG. 6) may generate current control signal 610 (FIG. 6), which may be a multi-bit code, to vary the current provided by the current source. Operation 706 may include refraining from changing the current of another current source, such as current source 424 (FIG. 4).

In operation 710, state machine 604 may monitor the selected output of the comparator element to determine when the output toggles, by monitoring output 616 (FIG. 6). Operations 706 and 710 may be performed until the output of the selected comparator element toggles.

When the output toggles, operation 712 is performed. In operation 712, an offset cancellation signal may be stored in a storage element associated with the comparator element. In embodiments, operation 712 may latch the multi-bit code generated by state machine 604 (FIG. 6) as control signal 610 (FIG. 6) into one of latches 603 (FIG. 6). In these embodiments, latches 603 (FIG. 6) may include a latch for each comparator element 400 to store a multi-bit code as the offset cancellation signal 410 (FIG. 4).

Operation 714 determines if there are additional comparator elements in the current receiver unit and, when there are, operations 704 through 714 are repeated for the remaining comparator elements of the current receiver unit.

Operation 716 determines if there are additional receiver units. When there are additional receiver units, operations 716 are performed for the additional receiver units. Upon the completion of operation 716 for each receiver unit, latches 603 (FIG. 6) may store codes for to reduce or substantially cancel offsets in each of the comparator element in system 600 (FIG. 6).

In operation 718, the input short placed on the inputs in operation 702 may be removed, and in operation 720, the receiver system may receive data. During the performance of operation 720, the comparator elements may operate with the current of one current source set during operation 710. Procedure 700 may be repeated the next time the system is powered up or when the receiver is not receiving.

Although the individual operations of procedure 700 are illustrated and described as separate operations, one or more of the individual operations may be performed concurrently and nothing requires that the operations be performed in the order illustrated.

In an embodiment, an article is provided. The article may comprise a storage medium having stored thereon instructions, that when executed by a computing platform, result in shorting differential inputs of a receiver together, and selecting an output of a comparator element. The comparator element may have first and second current sources to provide current to corresponding differential amplifier half-circuits. The instructions may further result in changing a current provided by the second current source until the selected output toggles, and setting the current provided by the second current source at level when the output toggled. In this embodiment, the article may be a storage medium including one or more memory devices, computer discs, etc. The storage medium may be coupled a processing device, such as a microprocessor or processing element, or may be part of or coupled to state machine 604 (FIG. 6).

Figure 8:
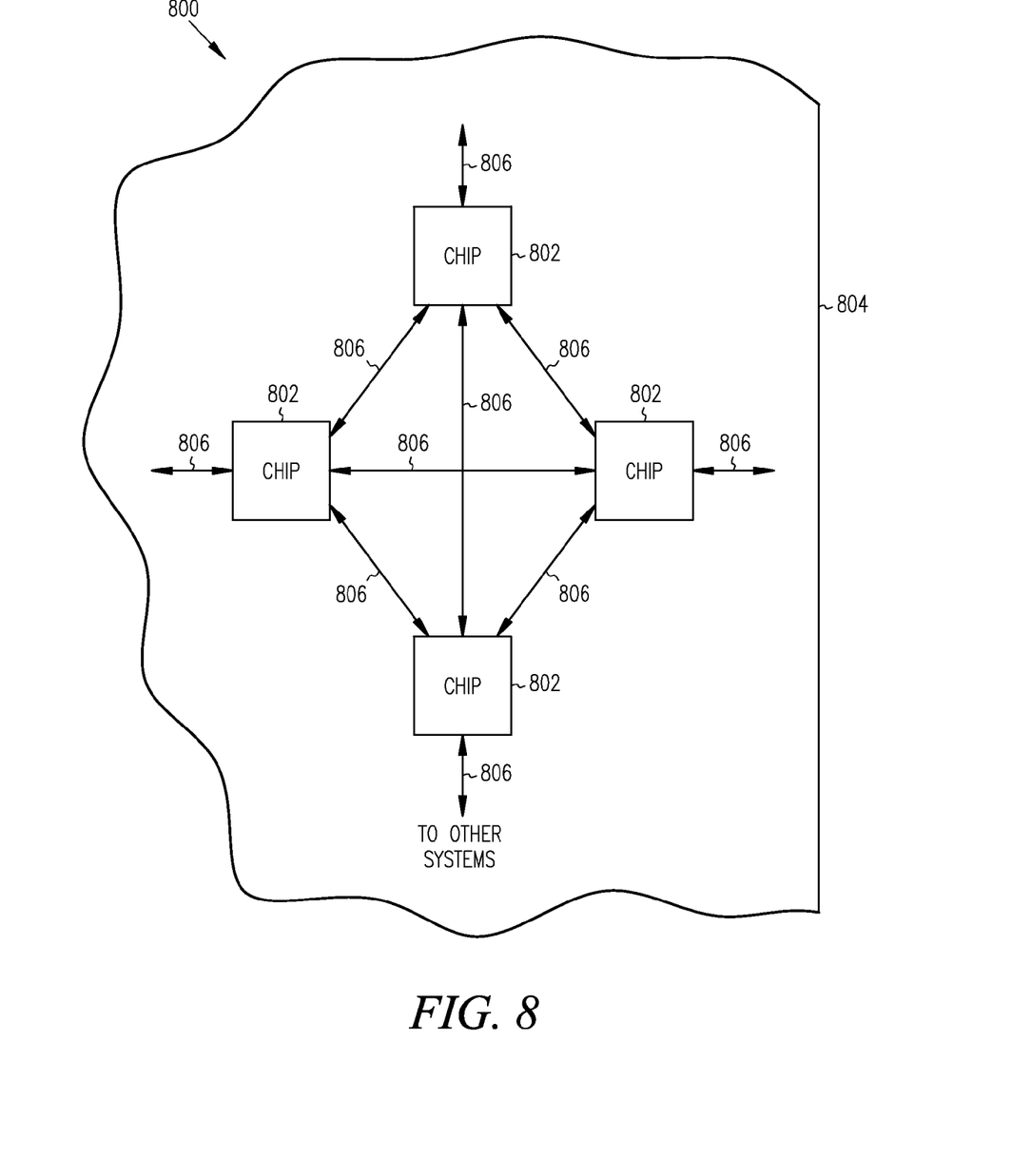
FIG. 8 illustrates a server system in accordance with an embodiment of the present invention.

FIG. 8 illustrates a server system in accordance with embodiments of the present invention. System 800 is comprised of a plurality of chips 802 mounted on circuit board 804. Communication links 806 allow high-speed communications among the chips. Although only four of chips 802 are illustrated for simplicity, system 802 may include tens and even hundreds of chips 802. In some embodiments, some of chips 802 may be located off of board 804. System 100 (FIG. 1) may be implemented as part of system 800. In embodiments, at least some of links 806 may be high-speed serial links for the communication of differential signals. In these embodiments, at least some of chips 802 may include receiver systems, such as receiver system 600 (FIG. 6), to receive communications from other chips. In these embodiments, each receiver unit 602 (FIG. 6) may receive high-speed serial communications from another chip over links 806. System 800 may be part of a server system, personal computer or other processing system. Chips 802 may be any semiconductor device that communicates with others within the system. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, embodiments of the invention embrace all such alternatives, modifications, equivalents and variations as fall within the spirit and scope of the appended claims.

What is claimed is:

1. A receiver to receive differential signals comprising:
   a comparator stage to receive a differential input signal, the comparator stage having one or more comparator elements, each comparator element comprising a fixed current source and a variable current source to provide current to corresponding differential amplifier half-circuits; and
   an offset cancellation controller to generate an offset cancellation signal to set current provided by the variable the multi-channel output comparator elements, the set current to at least partially offset an output difference between the differential amplifier half-circuits, wherein the comparator stage is comprised of a plurality of the comparator elements, and wherein the comparator stage generates a multi-channel output from the received differential input signal, the multi-channel output being a parallel output comprising two data bits and two edge bits, each comparator element of the comparator stage providing a corresponding channel of the multi-channel output, wherein the receiver is part of a receiver system comprised of a plurality of receiver units, each receiver unit having a sampler stage to provide a sampled differential input signal to a respective comparator stage of the receiver unit, and wherein the offset cancellation controller sequentially set an offset current for the variable current source of each of the comparator elements of each of the comparator stages, and stores a code in a latch associated with each comparator element.

2. The receiver of claim 1 wherein the offset cancellation controller is part of a state machine to generate instructions to short differential inputs of the comparator stages together, to change the current generated by the variable current source of each comparator element of each comparator stage by varying the offset cancellation signal, to monitor the output of the comparator element to determine when a change in polarity occurs at its output, and to set the current generated with the offset cancellation signal for each comparator element when the change at the output occurs.

3. The receiver of claim 1 wherein each receiver unit further comprises:
  a serial-to-parallel converter to convert a multi-channel output from the comparator stage to parallel data; and
  a data recovery element to process the parallel data and to generate output data,
  wherein the data recovery element generates a sample position indicator for use by a sampler stage of a corresponding receiver unit to adjust a sampling position of the sampler stage, the sampler stage to provide a sampled differential input signal to the comparator stage in response to the sample position indicator.

* * * * *

UNITED STATES PATENT AND TRADEMARK OFFICE
CERTIFICATE OF CORRECTION

| | | |
|---|---|---|
| PATENT NO. | : 7,391,824 B2 | Page 1 of 1 |
| APPLICATION NO. | : 10/444310 | |
| DATED | : June 24, 2008 | |
| INVENTOR(S) | : Wei et al. | |

It is certified that error appears in the above-identified patent and that said Letters Patent is hereby corrected as shown below:

In column 8, line 65, in Claim 1, delete "the multi-channel output" and insert -- current source of each of the one or more --, therefor.

In column 9, line 14, in Claim 1, delete "set" and insert -- sets --, therefor.

In column 10, line 10, in Claim 3, delete "a" and insert -- the --, therefor.

Signed and Sealed this

Ninth Day of September, 2008

JON W. DUDAS
*Director of the United States Patent and Trademark Office*